US008540836B1

(12) United States Patent
Hardin et al.

(10) Patent No.: US 8,540,836 B1
(45) Date of Patent: Sep. 24, 2013

(54) METHOD FOR APPLYING CODED LABELS TO CABLE

(75) Inventors: William K. Hardin, Carrollton, GA (US); Richard R. Miller, Carrollton, GA (US); Henry L. Adams, Carrollton, GA (US)

(73) Assignee: Southwire Corporation, Carrollton, GA (US)

( * ) Notice: Subject to any disclaimer, the term of this patent is extended or adjusted under 35 U.S.C. 154(b) by 0 days.

(21) Appl. No.: 13/220,323

(22) Filed: Aug. 29, 2011

Related U.S. Application Data

(62) Division of application No. 11/870,676, filed on Oct. 11, 2007.

(51) Int. Cl.
*B29C 51/16* (2006.01)

(52) U.S. Cl.
USPC ............ 156/212; 156/196; 156/227; 156/242

(58) Field of Classification Search
USPC .................. 156/227, 73.1, 52, 196, 212, 242, 156/DIG. 6; 40/316
See application file for complete search history.

(56) References Cited

U.S. PATENT DOCUMENTS

| | | | | |
|---|---|---|---|---|
| 951,147 | A | 3/1910 | Porter | |
| 1,798,486 | A | 3/1931 | Murphy | |
| 2,070,679 | A | 2/1937 | Pebock et al. | |
| 2,106,048 | A | 1/1938 | Candy, Jr. | |
| 2,372,868 | A | 4/1945 | Warren, Jr. | |
| 2,435,224 | A * | 2/1948 | Klopfenstein et al. | 156/433 |
| 2,530,655 | A | 11/1950 | Entwistle | |
| 2,591,794 | A | 4/1952 | Ebel | |
| 2,628,998 | A | 2/1953 | Frisbie | |
| 2,865,323 | A | 12/1958 | Hoff | |
| 2,989,943 | A | 6/1961 | Fitzgerald | |
| 3,020,335 | A | 2/1962 | Gillis | |
| 3,197,554 | A | 7/1965 | Baker | |

(Continued)

FOREIGN PATENT DOCUMENTS

| | | |
|---|---|---|
| CA | 1101951 A1 | 5/1981 |
| CH | 590544 | 8/1977 |

(Continued)

OTHER PUBLICATIONS

UL 1569, Underwriters Laboratories Inc., Standard for Safety, Metal-Clad Cables, Second Edition, published Sep. 10, 1998 (161 pages).

(Continued)

*Primary Examiner* — Katarzyna Wyrozebski Lee
*Assistant Examiner* — Vishal I Patel
(74) *Attorney, Agent, or Firm* — Gardere Wynne Sewell LLP

(57) ABSTRACT

Flexible indicia bearing labels are placed on armored electrical cable at spaced apart intervals while the cable is being moving continuously from an armoring station to a takeup reel or accumulator. A label dispenser places labels in a U shaped recess of a body which is moveable toward engagement with the cable. Opposed rollers fold one edge of the label over into engagement with the surface of the cable and the other edge of the label over onto itself in overlapping relationship. The cable is passed through a heat tunnel to shrink the labels into tight engagement with the cable. A controller monitors movement of the cable and controls actuators for applying and folding labels onto the cable at spaced apart intervals.

16 Claims, 6 Drawing Sheets

(56) References Cited

U.S. PATENT DOCUMENTS

| | | | | |
|---|---|---|---|---|
| 3,212,207 | A | 10/1965 | Searing | |
| 3,229,623 | A | 1/1966 | Rubinstein at al. | |
| 3,328,514 | A | 6/1967 | Cogelia | |
| 3,352,285 | A | 11/1967 | Buhmann | |
| 3,434,456 | A | 3/1969 | Geating | |
| 3,459,878 | A | 8/1969 | Gressitt et al. | |
| 3,474,559 | A | 10/1969 | Hunt | |
| 3,551,542 | A | 12/1970 | Perrone | |
| 3,650,862 | A | 3/1972 | Burr | |
| 3,720,747 | A | 3/1973 | Anderson et al. | |
| 3,766,883 | A | 10/1973 | Swaisgood | |
| 3,903,840 | A | 9/1975 | Gemelli | |
| 3,994,090 | A | 11/1976 | Wheeler | |
| 4,021,315 | A | 5/1977 | Yanagida et al. | |
| 4,029,006 | A | 6/1977 | Mercer | |
| 4,128,736 | A | 12/1978 | Nutt et al. | |
| 4,158,746 | A | 6/1979 | Taylor et al. | |
| 4,161,564 | A | 7/1979 | Legbandt | |
| 4,272,689 | A | 6/1981 | Crosby et al. | |
| 4,274,086 | A | 6/1981 | Benckendorff et al. | |
| 4,278,836 | A | 7/1981 | Bingham | |
| 4,367,417 | A | 1/1983 | Casasanta | |
| 4,399,371 | A | 8/1983 | Ziff et al. | |
| 4,415,217 | A | 11/1983 | Clabburn et al. | |
| 4,415,765 | A | 11/1983 | Iwasa et al. | |
| 4,423,306 | A | 12/1983 | Fox | |
| 4,424,627 | A | 1/1984 | Tarbox | |
| 4,425,390 | A | 1/1984 | Changani et al. | |
| 4,465,717 | A * | 8/1984 | Crofts et al. | 428/41.9 |
| 4,500,796 | A | 2/1985 | Quin | |
| 4,503,437 | A | 3/1985 | Katzschner | |
| 4,528,420 | A | 7/1985 | Kish et al. | |
| 4,543,448 | A | 9/1985 | Deurloo et al. | |
| 4,543,716 | A | 10/1985 | Damiano et al. | |
| 4,563,050 | A | 1/1986 | Greenwood et al. | |
| 4,579,759 | A | 4/1986 | Breuers et al. | |
| 4,618,203 | A | 10/1986 | Greenwood et al. | |
| 4,627,684 | A | 12/1986 | D'Amato | |
| 4,629,285 | A | 12/1986 | Carter et al. | |
| 4,636,017 | A | 1/1987 | Boteler | |
| 4,636,271 | A | 1/1987 | Gandolfo | |
| 4,637,743 | A | 1/1987 | Kerner et al. | |
| 4,717,357 | A | 1/1988 | Greenwood | |
| 4,775,802 | A | 10/1988 | Dods | |
| RE32,819 | E | 1/1989 | Waugh | |
| 4,880,484 | A | 11/1989 | Obermeier et al. | |
| 4,947,568 | A | 8/1990 | De Barbieri | |
| 4,997,994 | A | 3/1991 | Andrews et al. | |
| 5,038,001 | A | 8/1991 | Koegel et al. | |
| 5,049,721 | A | 9/1991 | Parnas et al. | |
| 5,110,638 | A | 5/1992 | Vogdes et al. | |
| 5,237,917 | A | 8/1993 | Traut et al. | |
| 5,281,764 | A | 1/1994 | King et al. | |
| 5,285,723 | A | 2/1994 | Ichikawa et al. | |
| 5,289,767 | A | 3/1994 | Montalto et al. | |
| 5,350,885 | A * | 9/1994 | Falciglia et al. | 174/112 |
| 5,377,292 | A | 12/1994 | Bartling et al. | |
| 5,444,466 | A | 8/1995 | Smyczek et al. | |
| 5,449,302 | A | 9/1995 | Yarbrough et al. | |
| 5,470,253 | A | 11/1995 | Siems et al. | |
| 5,504,540 | A | 4/1996 | Shatas | |
| 5,557,071 | A | 9/1996 | Falciglia et al. | |
| 5,561,900 | A | 10/1996 | Hosler, Sr. | |
| 5,703,983 | A | 12/1997 | Beasley, Jr. | |
| 5,719,353 | A | 2/1998 | Carlson et al. | |
| 5,739,472 | A | 4/1998 | Buck et al. | |
| 5,777,271 | A | 7/1998 | Carlson et al. | |
| 5,862,774 | A | 1/1999 | Moss | |
| 5,887,368 | A | 3/1999 | Rupp | |
| 5,904,037 | A | 5/1999 | Grulick et al. | |
| 5,982,967 | A | 11/1999 | Mathis et al. | |
| 6,113,996 | A | 9/2000 | Amon et al. | |
| 6,207,902 | B1 | 3/2001 | Balaguer | |
| 6,277,456 | B1 | 8/2001 | Bulgrin et al. | |
| 6,311,637 | B1 | 11/2001 | Moss | |
| 6,358,083 | B1 | 3/2002 | Kraft | |
| 6,370,304 | B1 | 4/2002 | Mills et al. | |
| 6,371,585 | B2 | 4/2002 | Kurachi | |
| 6,404,972 | B1 | 6/2002 | Pasch et al. | |
| 6,562,454 | B2 | 5/2003 | Takahashi et al. | |
| 6,727,433 | B2 | 4/2004 | Tsai | |
| 6,817,895 | B2 | 11/2004 | Kiely | |
| 6,825,418 | B1 | 11/2004 | Dollins et al. | |
| 6,906,264 | B1 | 6/2005 | Grant, Jr. et al. | |
| 6,918,788 | B2 | 7/2005 | Cavanaugh | |
| 7,465,878 | B2 | 12/2008 | Dollins et al. | |
| 2004/0098889 | A1 | 5/2004 | Proctor | |
| 2009/0001707 | A1 | 1/2009 | Brooks | |

FOREIGN PATENT DOCUMENTS

| | | | |
|---|---|---|---|
| DE | 1902057 | | 10/1970 |
| DE | 4016445 | | 8/1991 |
| DE | 29921017 | U1 | 4/2000 |
| EP | 0829884 | A1 | 3/1998 |
| FR | 2686185 | A1 | 7/1993 |
| GB | 194419 | | 3/1923 |
| GB | 260837 | A | 11/1926 |
| GB | 332303 | | 7/1930 |
| GB | 826273 | A | 12/1959 |
| GB | 913514 | | 12/1962 |
| GB | 1117862 | | 6/1968 |
| GB | 1173401 | A | 12/1969 |
| GB | 1432548 | | 4/1976 |
| GB | 2154785 | | 9/1985 |
| JP | 49-020780 | | 2/1974 |
| JP | 50-046970 | | 4/1975 |
| JP | 52-121679 | | 10/1977 |
| JP | 54142587 | A | 11/1979 |
| JP | 55-120031 | | 9/1980 |
| JP | 57-143379 | | 9/1982 |
| JP | 57198510 | | 12/1982 |
| JP | 59087194 | | 5/1984 |
| JP | 60-097179 | | 5/1985 |
| JP | 62-037186 | | 2/1987 |
| JP | 62202417 | A | 9/1987 |
| JP | 64-081113 | | 3/1989 |
| JP | 1-134808 | | 5/1989 |
| JP | 3-25806 | | 2/1991 |
| JP | 3-067411 | | 3/1991 |
| JP | 03-173015 | | 7/1991 |
| JP | 04-163048 | | 6/1992 |
| JP | 04-312850 | | 11/1992 |
| JP | 7249321 | A | 9/1995 |
| JP | 10144149 | A | 5/1998 |
| JP | 11167821 | A | 6/1999 |
| JP | 2001292513 | A | 10/2001 |
| NL | 6510231 | | 2/1966 |

OTHER PUBLICATIONS

CommScope Fiber Optic Cable Products Catalog (70 pages), Date Unknown.

CommScope Spec Sheet for Single Jacket Single Armor Outdoor Cable, 2-288 Fiber Arid-Core(R) Construction, Stranded Loose Tube with 12-fiber Subunits, dated Feb. 14, 2006 (1 page).

UL4; Underwriters Laboratories, Inc., Armored Cable, ISBN 1-55989-986-7, 14th Ed., Jan. 30, 1996, Rev. Feb. 14, 2001.

Kaf-Tech™, Introduction to ColorTrack ID System Cables, 24 pages, Sep. 2006.

AFC Cable Systems, AFC Field Report: Green HCF-90® Cable, 2 pages, Date Unknown.

AFC Cable Systems, AFC Field Report: Red Fire Alarm/Control Cable™, 2 pages, Date Unknown.

Wiremold/Legrand®, ED339R1,5-Wire Chan-L-Wire® System Product Specifications, 2 pages, 2008.

The Wiremold Company™, 40766, Chan-L-Wire® Pro Series System Installation Instructions, 4 pages, 1996.

* cited by examiner

METHOD FOR APPLYING CODED LABELS TO CABLE

CROSS REFERENCE TO RELATED APPLICATION

This application is a division of U.S. patent application Ser. No. 11/870,676, filed Oct. 11, 2007, and entitled "Method and System for Applying Labels to Armored Cable and the Like," the disclosure of which is incorporated herein by reference in its entirety.

BACKGROUND

In the art of manufacturing electrical cable, it is desirable and often necessary to apply certain indicia on the exterior of the cable body or armor covering, such indicia providing information regarding the specifications of the cable, such as wire size and voltage rating, as well as, possibly, other information which may be useful to users of the cable. For example, in the manufacture of armored electrical cable, it is desirable to place information on the exterior of the armor sheath or covering and spaced apart at relatively close intervals (two to three feet) indicating the wire size or gauge and the specific voltage to which the cable may be applied. However, due to the irregular exterior surface of armored electrical cable, in particular, printed information cannot be applied directly to the surface. Accordingly, spaced apart pre printed labels are typically necessary.

Moreover, in processes of manufacturing armored electrical cable, the continuous manufacturing processes used in making such do not lend themselves to easy application of labels during such manufacturing process. It must be assured, of course, that labels giving important information thereon be placed on the cable, such as armored electrical cable, wherein the information is clearly viewable and readable and in such a way that it will not be easily removed or destroyed.

Accordingly, there has been a need to provide a method for applying indicia to the exterior surface of electrical cable, particularly so-called armored electrical cable, wherein the indicia is supplied in the form of a label which is wrapped around the generally cylindrical exterior surface of the cable and is suitably adhered to the cable to prevent removal therefrom. The above-noted requirements have been particularly needed in the art of manufacture of metal clad armored electrical cable and it is to these ends that the present invention has been developed.

SUMMARY

The present invention provides a method for applying labels to the exterior surface of metal clad armored electrical cable and the like.

In accordance with one embodiment of the present invention, a method for applying labels to the exterior surface of armored electrical cable is provided wherein a finite flexible label, preferably formed of a heat shrinkable polymer material, is placed on the exterior surface of continuous formed metal clad cable at predetermined intervals, is wrapped tightly around the exterior surface of the armor covering and is further secured by heat shrinking the label to the surface.

In accordance with another embodiment of the present invention, a method of applying labels to the exterior surface of armored electrical cable is provided wherein the cable is subjected to a substantially continuous manufacturing process in which conductors to be armored are brought into proximity to an armor layer comprising a continuous strip of metal is wound in helical fashion around the conductor or conductors to form the armor covering, all done in a continuous manner and further wherein the armored cable is conducted past a label application station and then finally discharged to a so-called accumulator or takeup reel with labels applied to the cable on the exterior surface of the armor covering at spaced apart intervals. The steps of the method preferably include continuously moving the cable toward and through a label applicator and then a source of heat to assure adherence of labels to the cable exterior surface and then from the source of heat, such as a tunnel-like oven, to a storage or take up reel and/or a so-called accumulator.

It is to be understood that both the foregoing general description and the following detailed description are examples and explanatory only, and should not be considered to restrict the invention's scope, as described and claimed. Further, features and/or variations may be provided in addition to those set forth herein. For example, an embodiment of the invention may be directed to various feature combinations and sub-combinations described in the detailed description.

DETAILED DESCRIPTION OF THE EMBODIMENTS

Figure 1:
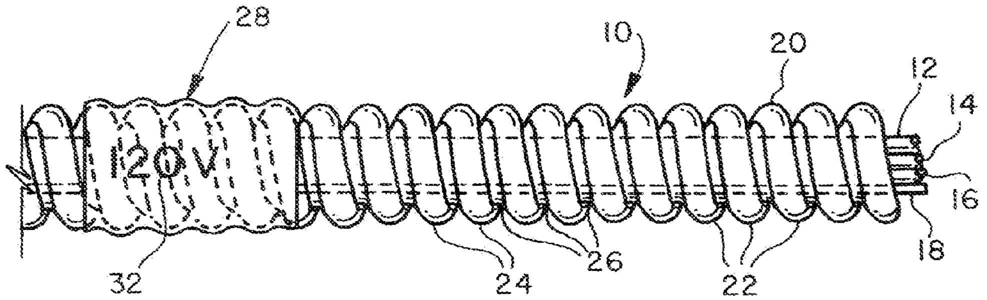
FIG. 1 is a side elevation of a section of metal clad armored electrical cable showing a label applied thereto in accordance with the method of the present invention.

In the description which follows, like parts are marked throughout the specification and drawings with the same reference numerals, respectively. The drawing figures may not be to scale and certain features may be shown in generalized or schematic form in the interest of clarity and conciseness.

Referring to FIG. 1, there is illustrated a section of metal clad armored electrical cable, generally designated by the numeral 10. The cable section 10 is characterized by plural, elongated somewhat flexible electrical conductors 12, 14, 16 and 18, around which is wrapped a continuous strip of metal cladding 20 formed in helical interlocking convolutions 22 thereby providing spaced apart somewhat convexly curved peaks 24 and concavely curved valleys 26, and in a configuration which is known to those skilled in the art. Peaks 24 and valleys 26 are actually continuous helical convolutions formed by the strip wrapping process. The metal clad armored cable 10 is exemplary and those skilled in the art will recognize that continuously formed tubular goods, such as other types of armored or insulated electrical cable and tubular goods, such as hose or the like, may also enjoy the benefits of the present invention. The cable 10 illustrated is provided with a flexible label 28, which may be formed of a heat shrinkable polymer material, such as biaxial polypropylene.

Figure 2:
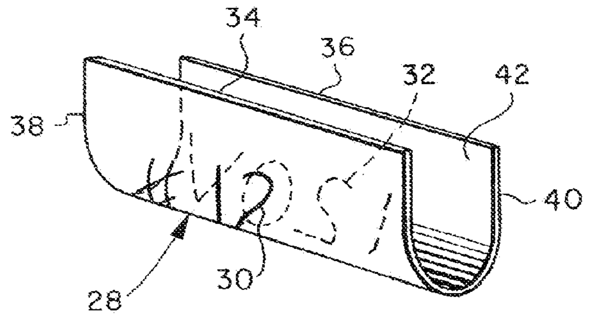
FIG. 2 is a perspective view of the label shown in FIG. 1 in a position at which it is applied to a continuously moving cable.

The label 28 is preferably formed of a flexible sheet of the polymer material described above so that the label may be folded into a channel shape or a somewhat U shape, as shown in FIG. 2, with suitable indicia provided thereon, such as a conductor wire size or gauge (#12), indicated by reference numeral 30, and a specified voltage (120V), as indicated by reference numeral 32, in FIGS. 1 and 2. Generally rectangular label 28 is provided with opposed longitudinal side edges 34 and 36 and opposed lateral edges 38 and 40. Label 28 may be wrapped around the metal cladding or sheath 20 with a slight amount of overlap between the edges 34 and 36 wherein, the edge 36 is covered by the edge 34, for example, and the label may be provided with a layer 42 of suitable adhesive on the side opposite the side containing the indicia 30 and 32. Label 28 may be provided in a strip of supporting tape, not shown, and a peel-away backing also not shown, for protecting the adhesive layer 42 whereby the protective backing may be peeled away and then individual labels are peeled away from the supporting tape, as labels are brought to a position to be applied to the sheath 20 of the cable section 10.

Figure 3:
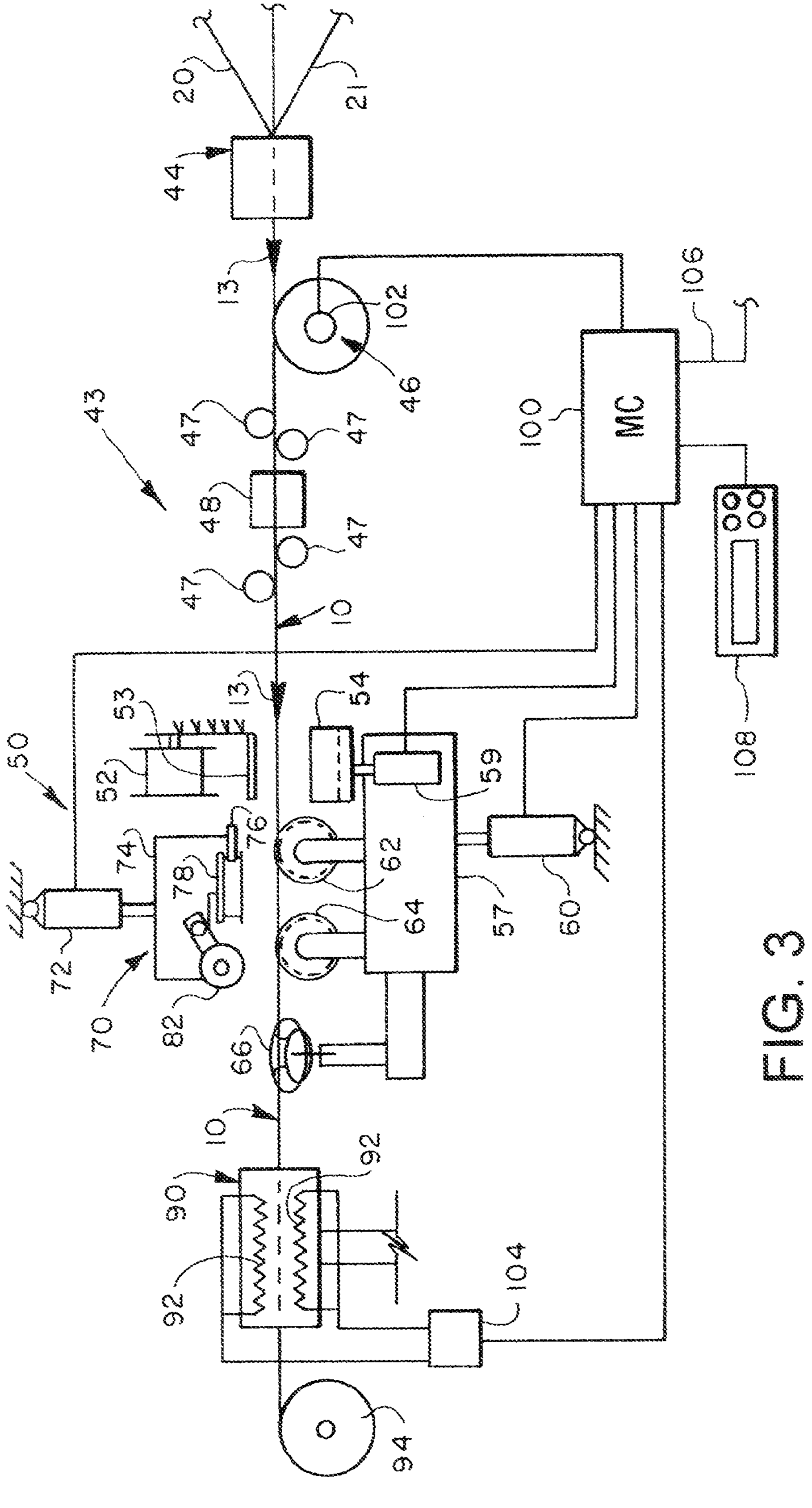
FIG. 3 is a schematic diagram of a label applicator system for applying labels to electrical cable generally of the type shown in FIGS. 1 and 2.

Referring now to FIG. 3, there is illustrated a system 43 for applying labels 28 to the armored cable 10 at selected spaced apart intervals. Preferably, the labels 28 are applied to the cable 10 as it is being manufactured in a continuous process by apparatus which includes an armoring station, generally designated by the numeral 44, at which plural conductors, the metal cladding or sheath strip 20 and possibly an inner insulating sheath 21 are brought together and the sheath strip 20 is wrapped over the conductors and the insulating sheath to form the armored cable 10. As shown in FIG. 3, the armored cable 10 proceeds in the direction of the arrows 13 in a continuous process whereby the cable is pulled by a motor driven capstan 46 from the armoring station or apparatus 44, is guided by selected sets of guide rollers 47 disposed on either side of an inspection station 48 and is then introduced to a label applicator station 50.

Figure 4:
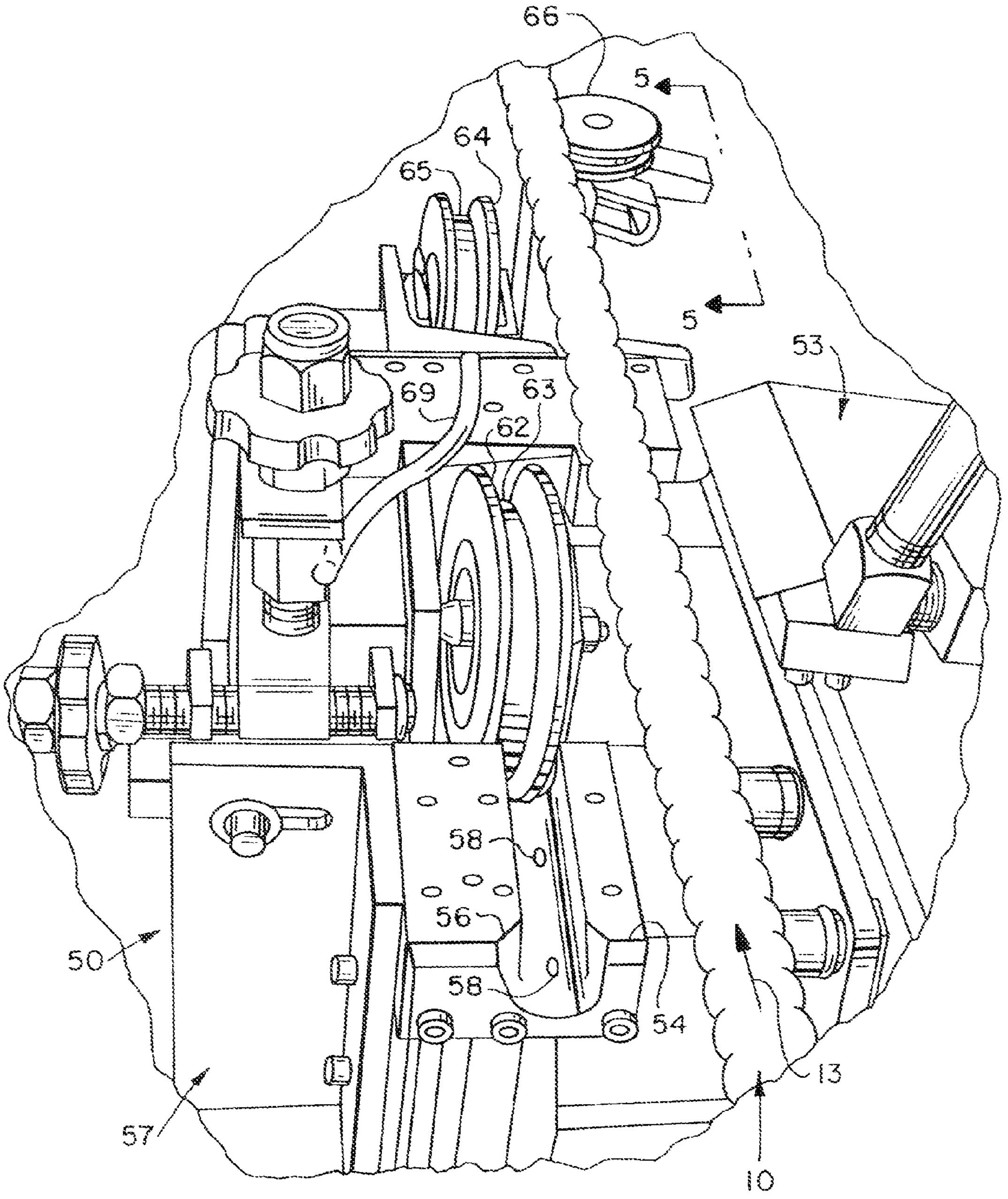
FIG. 4 is a detail perspective view of a portion of the label applicator system looking, generally, in the direction of movement of the cable.

Label applicator station 50 includes, preferably, a storage reel 52 for a roll of labels 28 whereby respective ones of the labels 28 are peeled from a supporting tape or the like, not shown and are placed in an applicator body 54, which body is formed with a channel or substantially U shaped recess 56, see FIG. 4. One or more vacuum ports 58, FIG. 4, may be provided in the applicator body 54 and connected a suitable source of vacuum for holding a label 28 in the shape as shown in FIG. 2, within the recess 56 when such label is dispensed from the dispensing apparatus 53 shown in FIGS. 3 and 4. Label applicator body 54 is mounted on a suitable frame 57 by way of a pressure fluid cylinder and piston type actuator 59, FIG. 3. Actuator 59 is operable to move the applicator body 54 vertically, viewing FIG. 3 with respect to the support or frame 57, and the support or frame 57 is also mounted for vertical movement with respect to cable 10 by a suitable actuator 60, FIG. 3. Accordingly, the label applicator body 54 may move with the frame 57 and may move relative to the frame 57 for placing a label in contact with the exterior surface of the sheath 20 of continuously formed cable 10.

Figure 5:
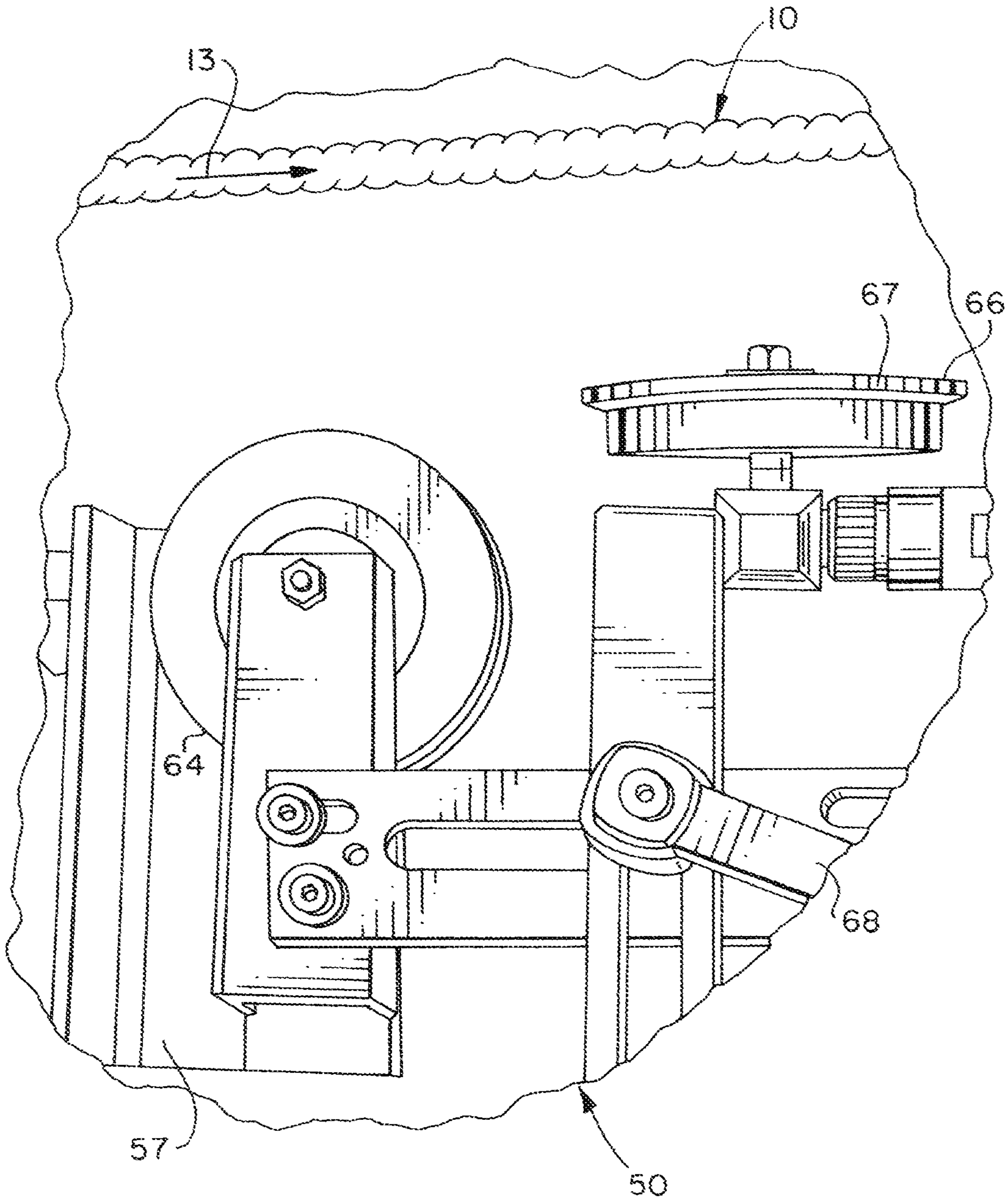
FIG. 5 is a detail perspective view taken generally from the line 5-5 of FIG. 4.

Frame 57 is also adapted to support spaced apart guide rollers 62 and 64, which are aligned with the recess 56, see FIGS. 3 and 4. Rollers 62 and 64 are both formed to have relatively deep circumferential grooves or recesses 63 and 65 formed therein, respectively, FIG. 4 for receiving the continuously fed armored cable 10 as it proceeds in the direction indicated by arrows 13 in FIGS. 3 and 4. In the illustration of FIG. 4, the applicator body support frame 57 is retracted away from the continuously fed cable 10 and the applicator body 54 is retracted with respect to the rollers 62 and 64. The frame 57 still further supports a guide roller 66, FIGS. 3, 4 and 5, which is rotatable in a plane which intersects the plane of rotation of the rollers 62 and 64 at a substantially acute angle. Guide roller 66 is provided with a single lateral circumferential flange 67, FIG. 5, and is supported for movement with respect to the guide roller 64 by a suitable mechanism 68.

Labels 28 are applied to the continuously fed armored cable 10 at defined intervals, preferably every two to three feet for example, by dispensing a label into the recess 56 of applicator body 54 so that the label assumes the shape shown in FIG. 2, and wherein it is preferably held by at least a slight vacuum force supplied through the ports 58, FIG. 4. At the appropriate time, the actuator 59 is energized to move the applicator body 54 upward, viewing FIGS. 3 and 4, until a label 28 held thereby engages the cable 10, which is moving continuously at a velocity of about twenty-five to thirty feet per minute. Accordingly, the label 28 is tamped or tacked onto the exterior surface of the cable 10 with the lateral edges 34 and 36 spaced apart as shown in FIG. 2.

However, at this time, it is necessary to fold the lateral edges 34 and 36 over into engagement with the exterior surface of the cable 10. In this respect, label edges 34 or 36 are engaged by folding bar 69 that serves to further engage edge 34 or 36 against the cable. To provide_at least a slight overlap between the edges 34 and 36 the label edges 34 and 36 are engaged by a label folding roller set mounted on a generally vertically movable head, generally designated by the numeral 70 in FIG. 3. The label folding head 70 is supported for movement, generally vertically downward viewing FIGS. 3 and 6, by a suitable pressure fluid cylinder and piston type actuator 72. Actuator 72 supports a body 74 on which opposed, rollers 76 and 78 are mounted for rotation in a generally horizontal plane. Roller 76 is provided with a single circumferential rim 77, and roller 78 includes a circumferential channel or somewhat U shaped recess 79, see FIGS. 6 and 7, defined by opposed circumferential flanges 80 and 81, FIG. 7. Flange 80 is generally coplanar with or slightly offset from the rim 77 of roller 76, as shown in FIG. 7. Flange 80 is also preferably of a larger diameter than flange 81, also as shown in FIG. 7.

Figure 6:
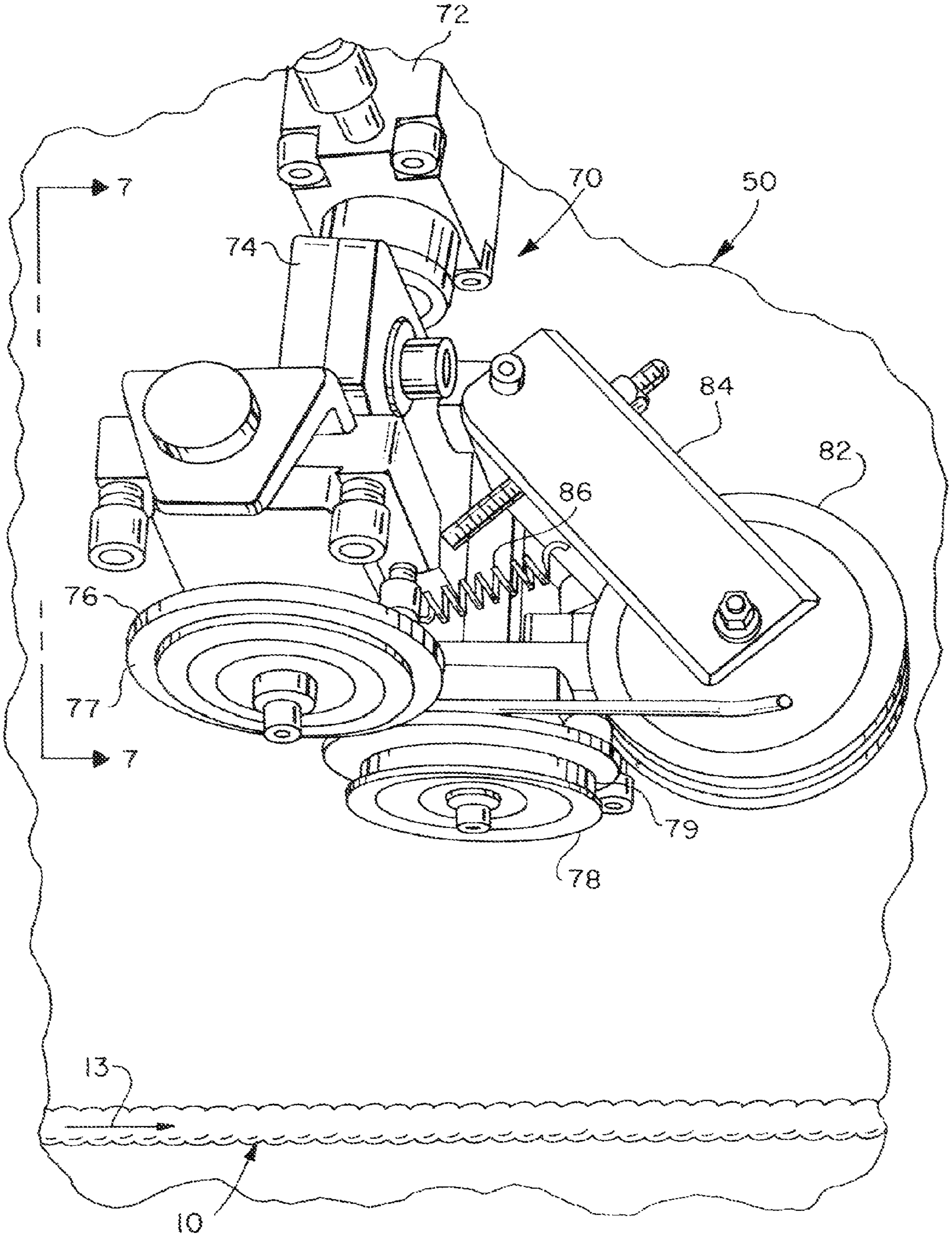
FIG. 6 is a detail perspective view of a moveable head with label folding and guide rollers mounted thereon.
Figure 7:
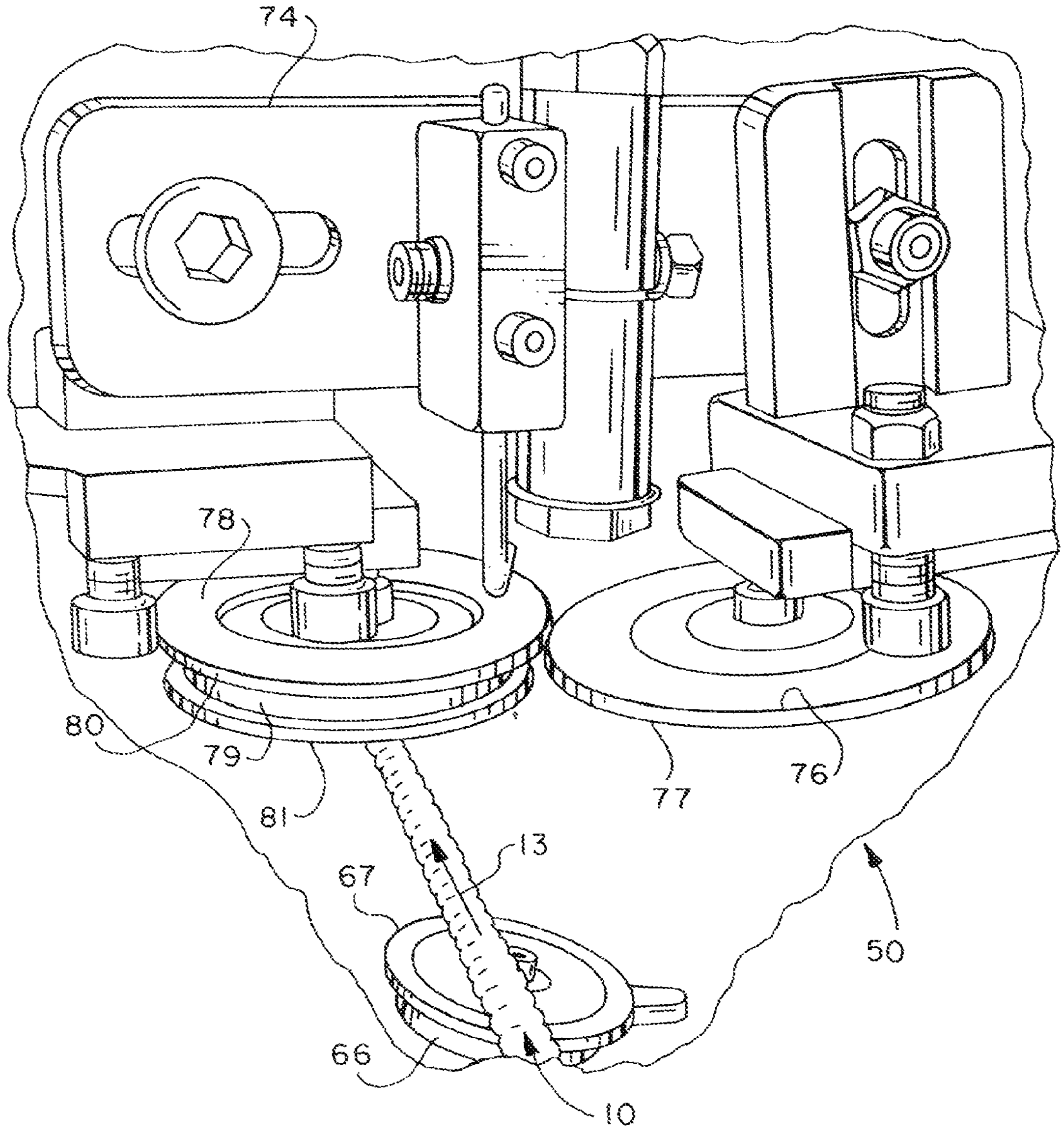
FIG. 7 is a detail perspective view taken generally from the line 7-7 of FIG. 6.

Referring further to FIG. 6, the body 74 also supports a guide roller 82 having a configuration including a circumferential groove or recess similar to the guide rollers 62 and 64. Guide roller 82 is mounted for rotation on an arm 84 supported for pivotal movement on the body 74 and guide roller 82 is biased by a coil spring 86 interconnected between the body 74 and the arm 84 and biasing the roller 82 generally downwardly, viewing FIG. 6, into contact with the continuous cable 10.

Accordingly, when the actuator 72 moves the body 74 downwardly, viewing FIGS. 6 and 7, the guide or label folding rollers 76 and 78 are placed in a position whereby, as a label 28 proceeds from the label applicator body 54 toward the guide roller 66, the rim 77 of roller 76 engages the side of the label which is delimited by edge 36 and folds edge 36 down against the exterior surface of the sheath or jacket 20. This occurs because the diameter and position of the axis of rotation of roller 76 places rim 77 closer to the applicator body 54 than the flange 80 of roller 78, whereby the rim 77 engages the label 28 before it becomes engaged with the roller 78. However, as a label 28 attached to the cable 10 proceeds in the direction of the arrows and arrowheads 13, the side of the label delimited by the edge 34 engages the roller 78 and edge 34 is folded down on top of edge 36 in overlapping relationship whereby the label is now firmly attached circumferentially to the cable 10. The label 28 is then firmly tamped into engagement with the cable 10 by the guide rollers 82 and 66 as the label applied to the cable passes by.

Still further, it is desirable to more firmly adhere the label 28 to the sheath 20 of cable 10 by passing the cable through a heated tunnel type structure 90, FIG. 3, whereby suitable heating elements 92 therein are operable to apply heat to the label 28 to shrink it more tightly to the sheath 20. Finally, the cable 10 with spaced apart labels 28 formed thereon, as described above, is wound onto a takeup reel or accumulator 94, FIG. 3, which take up reel or accumulator is known to those skilled in the art of manufacturing of metal clad armored cable.

Referring again to FIG. 3, operation of the system 43, including label applicator 50, may be carried out using a suitable control system, including an electrical controller or microcontroller 100, adapted to receive a speed and/or position signal from a transducer 102 associated with the capstan 46 or otherwise adapted to determine the position of a particular point on the cable 10 as it traverses from the capstan 46 to the takeup reel or accumulator 94. Transducer 102 provides a suitable signal to microcontroller 100. Microcontroller 100 is also operably connected to suitable circuitry, not shown, for providing actuation of the actuators 59, 60 and 72 and for suitable mechanism for dispensing the labels 28 from the label dispenser 52, 53. Microcontroller 100 is also suitably connected to the heat tunnel 90 via a suitable control circuit 104 for applying heat to labels 28 as they progress through the heat tunnel with cable 10 and onto the takeup reel or accumulator 94. Microcontroller 100 is preferably connected to a source of electrical power, not shown, via suitable conductor means 106 and is also operable to be controlled by a user of the system shown in FIG. 3, via a user interface 108. Accordingly, in timed relationship to the movement of the cable 10 between the capstan 46 and the takeup reel 94, controller 100 will, at a suitable instance, cause actuation of actuator 60 to move the frame or body 57 to a position whereby the guide rollers 62, 64 and 66 are all in very close proximity to or in contact with the cable 10. Actuator 59 is then actuated to move the label applicator body 54 to a position to receive a label from the dispenser 52, 53 and at the proper interval actuator 59 moves applicator body 54 containing a label therein into momentary engagement with the cable 10 as it traverses from right to left in the direction of the arrows/arrowheads 13 to apply a label 28 shaped as shown in FIG. 2, to the cable 10. As the cable 10 with label 28 thereon progresses to the left, viewing FIG. 3, it is supported by the rollers 62, 64 and label 28 is engaged as described above by the rollers 76 and 78 to fold the edge 36 over onto the surface of the sheath 20 and to fold edge 34 over onto and overlapping edge 36 completely enveloping the sheath 20. Label 28 is then more firmly secured as it traverses by and engages rollers 82 and 66 and then is heat shrunk onto the sheath 20 by the heater or heat tunnel 90. This process is, of course, carried out or repeated continuously at timed intervals as the cable 10 moves between the capstan 46 and the takeup reel 94 under control of the controller 100.

Although embodiments have been described in detail of a method of applying labels to a continuous armored cable or similar structure has been described in detail herein. Applicant verily believes that one skilled in the art may practice the invention based on the foregoing description. Conventional engineering materials, elements and control features are obtainable for constructing a label applicator, such as the label applicator 50, and for carrying out the method of the invention. Although embodiments have been described in detail, it is also believed that one skilled in the art will recognize that various substitutions and modifications may be made without departing from the scope and spirit of the appended claims.

What is claimed is:

1. A method for labeling armored electrical cable between an armoring station for said cable and a takeup reel for storage of said cable, the cable having an outermost sheath with convolutions defining alternating peaks and valleys, the method comprising the steps of:

applying, using a machine, a plurality of separate labels having a label substrate with an attaching side and an opposed indicia side, to the outermost sheath of the armored electrical cable such that the attaching side contacts the outermost sheath, each separate label being applied circumferentially to said cable at spaced apart points on said cable while said cable traverses between said armoring station and said takeup reel, the labels being applied to contact the outermost sheath for substantially the entirety of the label and to cover at least one peak of the convolutions of the outermost sheath.

2. The method set forth in claim 1, including the step of:

providing indicia on said labels indicating one of a physical characteristic of said cable and an electrical characteristic of said cable.

3. The method set forth in claim 2, wherein:

indicia is provided identifying a wire gauge size of said cable.

4. The method set forth in claim 3, wherein:

indicia is provided indicating an electrical performance specification of said cable.

5. The method set forth in claim 1, including the step of:

providing an adhesive surface on said labels opposite respective sides of said labels having indicia thereon;

placing said labels in contact with said cable; and folding opposed edges of said labels over into engagement with a surface of said cable and a surface of said label, respectively.

6. The method set forth in claim 5 wherein:

said labels are placed in contact with said cable while said cable traverses substantially linearly and continuously between said armoring station and said takeup reel.

7. A method for labeling metal clad armored electrical cable comprising plural elongated electrical conductors having a metal armoring strip wrapped thereover in helical convolutions to form an outermost circumferential metal cladding having repeated peaks and valleys along the length of said cable, said method being carried out by placing labels, the labels having a substrate with an attaching side and an opposed indicia side, to an exterior surface of said outermost metal cladding at spaced apart intervals between an armoring station wherein said metal strip is applied over said conductors and a takeup reel for said cable, comprising the steps of:

placing said labels circumferentially around said metal cladding at spaced apart intervals of said cable while said cable is moving continuously between said armoring station and said takeup reel, the labels being applied such that the attaching side is oriented and attached to the outermost metal cladding for substantially the entirety of the label and adhering said labels tightly to said cable on an exterior surface of said metal cladding; and wherein each of said labels is non-conductive and circumferentially covers at least one respective peak of the metal cladding.

8. The method set forth in claim 7, including the step of: placing indicia on said labels, respectively, indicating one of a physical characteristic of said cable and an electrical characteristic of said cable.

9. The method set forth in claim 7, including the step of: providing an adhesive surface on said labels respectively, for adhering said labels to said cable while said cable moves continuously.

10. The method set forth in claim 9, including the step of: folding opposed edges of said labels over onto said exterior surface and onto said labels, respectively, to apply said labels circumferentially to said cable.

11. The method set for in claim 10, including the step of: further treating said labels to adhere said labels tightly to said cable.

12. The method set forth in claim 11, including the step of: heating said labels to shrink said labels into tight engagement with said cable.

13. The method of claim 7 wherein placing said labels further comprises applying said labels using a machine.

14. The method of claim 7 wherein placing said labels further comprises slightly overlapping opposed edges of the label body.

15. The method of claim 1 wherein opposed edges of said label body slightly overlap one another.

16. The method of claim 7 further comprising at least partially conforming said labels to the peaks and valleys of said metal cladding.

* * * * *